US009167622B2

(12) United States Patent
Homchaudhuri et al.

(10) Patent No.: US 9,167,622 B2
(45) Date of Patent: Oct. 20, 2015

(54) METHODS AND A SYSTEM OF MULTIPLEXING MULTIPLE CONCURRENT OPERATIONAL MODES ON A SINGLE PHYSICAL TRANSCEIVER BY OPPORTUNISTIC TIME STEALING

(71) Applicant: QUALCOMM Incorporated, San Diego, CA (US)

(72) Inventors: Sandip Homchaudhuri, San Jose, CA (US); Chandramouli Ganapathy, San Jose, CA (US); Guido Robert Frederiks, Aptos, CA (US); Alireza Raissinia, Monte Sereno, CA (US); Nitin A Changlani, San Jose, CA (US); Arunkumar Jayaraman, Redwood City, CA (US); Badrisrinivasan Sampathkumar, Cupertino, CA (US); Paul Husted, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 167 days.

(21) Appl. No.: 13/898,835

(22) Filed: May 21, 2013

(65) Prior Publication Data

US 2013/0315141 A1 Nov. 28, 2013

Related U.S. Application Data

(60) Provisional application No. 61/650,955, filed on May 23, 2012.

(51) Int. Cl.
*H04W 88/06* (2009.01)
*H04W 76/02* (2009.01)
(Continued)

(52) U.S. Cl.
CPC .............. *H04W 88/06* (2013.01); *H04W 36/14* (2013.01); *H04W 76/026* (2013.01); *H04W 24/00* (2013.01)

(58) Field of Classification Search
None
See application file for complete search history.

(56) References Cited

U.S. PATENT DOCUMENTS 6,006,106 A 12/1999 Cook et al.
6,131,049 A 10/2000 Marsan et al.
(Continued)

FOREIGN PATENT DOCUMENTS

CN 101056440 A 10/2007
CN 102036340 A 4/2011
(Continued)

OTHER PUBLICATIONS

Das G., et al., (Eds) Intelligent information technology, Proceedings from CIT 2004: 7th International Conference on Information Technology, Thakur, S.S., et al., "Clock Synchronization in IEEE 802.11 Ad Hoc Networks," Dec. 2004, pp. 180-189.
(Continued)

*Primary Examiner* — Hassan Kizou
*Assistant Examiner* — Deepa Belur
(74) *Attorney, Agent, or Firm* — Bay Area Technology Law Group PC

(57) ABSTRACT

Systems and methods are provided for enhancing the concurrency of a wireless device operating in multiple network contexts. By identifying opportunity instants that may exist within the normal exchange of information by a device having a single physical transceiver in a first network context, tasks for a second network context may be performed using the transceiver with minimal impact on performance related to the first network context and preferably in complete transparence to the first network context.

49 Claims, 5 Drawing Sheets

(51) Int. Cl.
*H04W 36/14* (2009.01)
*H04W 24/00* (2009.01)

(56) References Cited

U.S. PATENT DOCUMENTS

| | | | |
|---|---|---|---|
| 7,500,119 B2 | 3/2009 | Tsai | |
| 7,586,948 B2 | 9/2009 | Hiddink et al. | |
| 7,653,031 B2 | 1/2010 | Godfrey | |
| 8,027,378 B1 | 9/2011 | Yang et al. | |
| 8,099,094 B2 | 1/2012 | Marinier et al. | |
| 8,165,050 B2 | 4/2012 | Ngo et al. | |
| 8,279,896 B2 | 10/2012 | Etkin et al. | |
| 8,284,061 B1 | 10/2012 | Dione | |
| 8,301,760 B1 | 10/2012 | Zadicario et al. | |
| 2004/0146091 A1 | 7/2004 | Chang et al. | |
| 2004/0190648 A1 | 9/2004 | Anim-Appiah et al. | |
| 2004/0203817 A1 | 10/2004 | Rao et al. | |
| 2004/0218568 A1 | 11/2004 | Goodall et al. | |
| 2005/0176432 A1 | 8/2005 | Kamura et al. | |
| 2006/0009220 A1 | 1/2006 | Kiyomoto et al. | |
| 2007/0008922 A1 | 1/2007 | Abhishek et al. | |
| 2007/0047499 A1 | 3/2007 | Montojo et al. | |
| 2007/0116007 A1 | 5/2007 | Xiao et al. | |
| 2007/0140188 A1 | 6/2007 | Melkote et al. | |
| 2007/0147321 A1 | 6/2007 | Jung | |
| 2007/0165589 A1 | 7/2007 | Sakoda | |
| 2007/0249354 A1 | 10/2007 | Seo et al. | |
| 2007/0258419 A1 | 11/2007 | Zhao et al. | |
| 2008/0101324 A1 | 5/2008 | Stark | |
| 2008/0170551 A1 | 7/2008 | Zaks | |
| 2008/0232373 A1 | 9/2008 | Iyer et al. | |
| 2009/0034460 A1 | 2/2009 | Moratt et al. | |
| 2009/0067397 A1 | 3/2009 | Seok | |
| 2009/0129275 A1 | 5/2009 | Watanabe et al. | |
| 2009/0238133 A1 | 9/2009 | Sakoda | |
| 2009/0296864 A1 | 12/2009 | Lindoff et al. | |
| 2010/0029325 A1* | 2/2010 | Wang et al. | 455/553.1 |
| 2010/0144340 A1* | 6/2010 | Sudak | 455/426.1 |
| 2010/0177757 A1 | 7/2010 | Kim et al. | |
| 2010/0219250 A1 | 9/2010 | Wang | |
| 2010/0223524 A1 | 9/2010 | Duggan et al. | |
| 2010/0223534 A1 | 9/2010 | Earnshaw et al. | |
| 2010/0278065 A1 | 11/2010 | Sun et al. | |
| 2011/0002234 A1 | 1/2011 | Chang et al. | |
| 2011/0070836 A1 | 3/2011 | Park et al. | |
| 2011/0075635 A1 | 3/2011 | Ryu et al. | |
| 2011/0083065 A1 | 4/2011 | Singh et al. | |
| 2011/0090982 A1* | 4/2011 | Chen et al. | 375/285 |
| 2011/0255618 A1 | 10/2011 | Zhu et al. | |
| 2011/0305288 A1* | 12/2011 | Liu et al. | 375/260 |
| 2012/0082049 A1 | 4/2012 | Chen et al. | |
| 2012/0094681 A1* | 4/2012 | Freda et al. | 455/452.1 |
| 2012/0129560 A1 | 5/2012 | Lunden et al. | |
| 2012/0164948 A1* | 6/2012 | Narasimha et al. | 455/63.1 |
| 2012/0188998 A1 | 7/2012 | Philips et al. | |
| 2012/0314636 A1 | 12/2012 | Liu | |
| 2012/0321012 A1 | 12/2012 | Elenes et al. | |
| 2013/0094536 A1 | 4/2013 | Hui et al. | |
| 2013/0194955 A1 | 8/2013 | Chang et al. | |
| 2013/0201838 A1 | 8/2013 | Homchaudhuri et al. | |
| 2013/0230035 A1 | 9/2013 | Grandhi et al. | |
| 2014/0133469 A1 | 5/2014 | Lee et al. | |
| 2014/0173600 A1* | 6/2014 | Ramakrishnan Nair | 718/1 |
| 2014/0177501 A1 | 6/2014 | Seok et al. | |
| 2014/0241226 A1 | 8/2014 | Jia et al. | |
| 2015/0071084 A1 | 3/2015 | Homchaudhuri et al. | |
| 2015/0170317 A1* | 6/2015 | Samson et al. | 712/1 |

FOREIGN PATENT DOCUMENTS

| | | |
|---|---|---|
| EP | 1424862 A1 | 6/2004 |
| EP | 1971164 A1 | 9/2008 |
| EP | 2106192 A2 | 9/2009 |
| EP | 2372949 A1 | 10/2011 |
| KR | 20060014900 A | 2/2006 |
| KR | 100813884 B1 | 3/2008 |
| WO | 9427377 A1 | 11/1994 |
| WO | WO-2008027907 A2 | 3/2008 |
| WO | WO-2008147130 A2 | 12/2008 |
| WO | 2009062185 A2 | 5/2009 |
| WO | WO-2013008989 A1 | 1/2013 |

OTHER PUBLICATIONS

International Search Report and Written Opinion—PCT/US2013/023501—ISA/EPO—Apr. 16, 2013.
International Search Report and Written Opinion—PCT/US2013/042187—ISA/EPO—Sep. 30, 2013.
Taiwan Search Report—TW102117958—TIPO—Mar. 25, 2015.

* cited by examiner

METHODS AND A SYSTEM OF MULTIPLEXING MULTIPLE CONCURRENT OPERATIONAL MODES ON A SINGLE PHYSICAL TRANSCEIVER BY OPPORTUNISTIC TIME STEALING

RELATED APPLICATIONS

The present application claims priority of provisional patent application Ser. No. 61/650,955 filed May 23, 2012.

FIELD OF THE PRESENT DISCLOSURE

This disclosure generally relates to wireless communication and more particularly to a wireless communication device capable of operating in more than one network context.

BACKGROUND

The development of multiple communication systems has led to situations where it is desirable to have a single device that is able to participate in multiple network contexts. At a fundamental level, a wireless local area network (WLAN) may include a network configuration between at least one station and an access point to form a basic service set (BSS) in a standard Institute of Electrical and Electronic Engineers (IEEE) 802.11 infrastructure network model. However, an 802.11 wireless transceiver of a given device may be used in numerous other contexts. In one example, a single device may simultaneously be associated with two or more discrete BSSs. In another example, two or more wireless devices may communicate directly without a dedicated management device fulfilling the role of an access point in an ad hoc or peer-to-peer based communication, which may include WiFi Direct™ P2P and others. Further, a given device that may normally operate as a station, may also be configured to function as an access point to manage its own BSS. Additional network configurations are also possible, including Tunneled Direct Link Setup (TDLS) which utilizes direct links between stations through an access point.

Thus, there exists a need for a single wireless communications device capable of operating in multiple contexts at the same time. The aspect of simultaneous function in multiple contexts may generally be referred to as concurrency. In one example, it may be desirable for a single wireless device to maintain a link to two or more independent BSSs, each of which requires its own schedule of communication events in order to maintain the links. However, concurrent operation may also involve a single device participating as one type of network node in a first context and a different type in a second context. For example, a device communicating in one network context as a station may simultaneously establish a peer-to-peer connection with another device or a single device may function as an access point with respect to a first BSS and as a station with respect to a second BSS. As such, it would be desirable for a single physical device to participate in multiple network contexts simultaneously while employing the same physical transceiver.

In order to provide concurrency with a single transceiver, some mechanism must be employed to allow the device to perform at least a minimum number of tasks required to provide operational functionality in each network context. This may include fulfilling at least the minimum exchange of information for operation, such as the requirement for a station to respond to an access point beacon at least once within a given period in order to maintain the link. Similarly, a device acting as an access point may need to transmit beacons with sufficient regularity and respond to requests to maintain a link. As a practical matter, this type of sporadic communication represents an extreme minimum case as the existence of a normal active communication link will typically involve a more continual exchange of information between the nodes. In addition, a device may need to perform other tasks to provide proper operation in a given network context, such as channel scanning, device discovery or channel assessment. Accordingly, time division concurrency strategies typically involve identifying periods of time when operation is not required in a first network context and then attempting to satisfy required tasks in the second network context during those periods. For the purposes of this disclosure, a period of time when the transceiver may be able to switch away from one network context may be known as an opportunity instant.

One conventional form of concurrency involves the power save mode of a conventional 802.11 station. Stations operating in active mode typically receive the access point's beacon every beacon interval. Alternatively, the station may enter a sleep mode for a given listen interval. A properly configured device may use the listen interval in one network context as an opportunity instant to satisfy requirements of other network contexts. However, listen intervals generally represent poor opportunity instants because they are rigidly fixed periods of time determined with respect to one network context, but unrelated to any conditions existing with respect to the other network contexts. Thus, if there is a specific window in which the other network context must be engaged that does not align with the listen interval, such methods do not provide effective concurrency.

Further, as indicated above, typical communications links that are active involve relatively continual exchange of information which exacerbate the issues noted above. With regard to the use of the listen interval as an opportunity instant, a device in active traffic mode may never enter sleep mode and thus provide no potential for maintaining operation in the other network contexts. Further, existing 802.11 carrier sense access protocols also reduce the potential for opportunity instants. A station may either be in downlink mode and receiving or awaiting frames, or in an uplink mode which is under the control of a distributed channel access backoff function, such as enhanced distributed channel access (EDCA), with regard to reserving a channel. Thus, if a single device is attempting to operate in traffic mode for more than one network context at a time, providing sufficient opportunity instants may present significant challenges under conventional strategies.

Often, conventional concurrency techniques rely on enforcing a preemptive lower priority with regard to one network context, significantly degrading performance in that network context, to service the device in another network context. Indeed, as the number of network contexts increases, these problems are amplified. Further, enforcing priority often requires suspending activity within a first network context by explicitly signaling entrance to a power saving mode to obtain the opportunity instant to service the other network context tasks, increasing the overhead in bandwidth of the network and latency associated with the protocol message exchanges using the EDCA rules. In turn, this also places additional strain on the access point, including the requirement that it start buffering data for the device. The greater the number of such devices in the network, the more significant the impact on the access point Accordingly, what has been needed are systems and methods for enhancing the concurrency of a wireless device operating in multiple network contexts while the device is actively connected with one or more other network nodes. This disclosure satisfies this and other goals.

SUMMARY

This specification discloses a device for wireless communication including a single physical device having a first transceiver, a primary virtual device, at least one secondary virtual device, and a first concurrency module, wherein the primary virtual device and at least one secondary virtual device are implemented by the first transceiver, wherein each primary virtual device and at least one secondary virtual device is configured to operate in an independent network context, wherein the first concurrency module may identify an opportunity instant based, at least in part, on operation of the primary virtual device, suspend activity of the primary virtual device in a primary network context locally and transparently to a remote end of the primary network context, store a state of the primary network context and perform a secondary network context task using a secondary virtual device.

The opportunity instant may be identified based, at least in part, on information obtained from a physical layer header of a frame received by the primary virtual device. In one aspect, the opportunity instant is identified based, at least in part, on a partial association identifier obtained from the physical layer header. As such, the opportunity instant may be identified based, at least in part, on a group identifier obtained from the physical layer header or on an end of file (EOF) delimiter of the frame. In another aspect, the opportunity instant may be identified based, at least in part, on information obtained from a media access control (MAC) layer header of a frame received by the primary virtual device. Accordingly, the opportunity instant may be identified based, at least in part, on a notice of absence (NOA) information element (IE) of the frame, on a quiet information element (QIE) of the frame, or on a receive address obtained from the MAC layer header. Further, the opportunity instant may have a duration based, at least in part, on a network allocation vector (NAV) of the frame. In another aspect, the opportunity instant may be identified based, at least in part, on a doze state of the primary virtual device while operating in a downlink, multi user multiple input multiple output (MIMO) mode.

In one embodiment, the opportunity instant may be identified based, at least in part, on a channel quality metric assessment regarding a frame received by the primary virtual device.

Further, the device may include an additional transceiver for a separate wireless communication system and wherein the opportunity instant is identified based, at least in part, on coexistence information regarding a separate wireless communication system. The separate wireless communication system may be a long term evolution (LTE) system or a Bluetooth® system.

Additionally, the opportunity instant may be identified during an active traffic mode of the primary virtual device.

In one embodiment, the first concurrency module may determine a Silence Interval (SI_INTV) associated with the opportunity instant, such that the secondary network context task may be performed within the SI_INTV. The first concurrency module may allow a first secondary virtual device to perform a first secondary network context task and may allow a second secondary virtual device to perform a second secondary network context task, such that the first and second secondary network context tasks may be performed within the SI_INTV. Further, the first concurrency module may select from secondary network context tasks associated with a first secondary virtual device and a second secondary virtual device based, at least in part, on a comparison of the SI_INTV to thresholds related to channel switching latencies. The selection may also be based, at least in part, on a hardware state of the first transceiver. Still further, the first concurrency module may allow a first secondary virtual device to perform a first secondary network context task during the SI_INTV, may identify an additional SI_INTV associated with the first secondary network context task and may allow a second secondary virtual device to perform a second secondary network context task during the additional SI_INTV.

In one embodiment, the first concurrency module may also restore the state of the primary network context using the primary virtual device after performing the secondary network context task.

In another embodiment, the single physical device may include a second transceiver. Further, the single physical device may have a second concurrency manager, wherein the second transceiver implements an additional primary virtual device and at least one additional secondary virtual device, each additional primary virtual device and at least one secondary virtual device configured to operate in an independent network context, wherein the second concurrency module may determine an opportunity instant based, at least in part, on operation of the additional primary virtual device, may suspend activity of the additional primary virtual device in an additional primary network context locally and transparently to a remote end of the additional primary network context, may store a state of the additional primary network context and may perform an additional secondary network context task using an additional secondary virtual device.

In yet another embodiment, the first concurrency module may determine a SI_INTV associated with the opportunity instant having a duration determined based, at least in part, on a time required to switch channels and processing delays.

This disclosure also includes methods for wireless communication. For example, one method may involve implementing a primary virtual device and at least one secondary virtual device operating in independent network contexts with a first transceiver of a single physical device, identifying an opportunity instant based, at least in part, on operation of the primary virtual device, suspending activity of the primary virtual device in a primary network context locally and transparently to a remote end of the primary network context, storing a state of the primary network context, and performing a secondary network context task using a secondary virtual device.

The opportunity instant may be identified based, at least in part, on information obtained from a physical layer header of a frame received by the primary virtual device. In one aspect, the opportunity instant is identified based, at least in part, on a partial association identifier obtained from the physical layer header. As such, the opportunity instant may be identified based, at least in part, on a group identifier obtained from the physical layer header or on an EOF delimiter of the frame. In another aspect, the opportunity instant may be identified based, at least in part, on information obtained from a MAC layer header of a frame received by the primary virtual device. Accordingly, the opportunity instant may be identified based, at least in part, on a NOA IE of the frame, on a QIE of the frame, or on a receive address obtained from the MAC layer header. Further, the opportunity instant may have a duration based, at least in part, on a NAV of the frame. In another aspect, the opportunity instant may be identified based, at least in part, on a doze state of the primary virtual device while operating in a downlink, MIMO mode.

In one embodiment, the opportunity instant may be identified based, at least in part, on a channel quality metric assessment regarding a frame received by the primary virtual device.

Further, the opportunity instant may be identified based, at least in part, on coexistence information regarding a separate wireless communication system. The separate wireless communication system may be a long term evolution (LTE) system or a Bluetooth system.

Additionally, the opportunity instant may be identified during an active traffic mode of the primary virtual device.

In one embodiment, the method may involve determining a SI_INTV associated with the opportunity instant, such that the secondary network context task may be performed within the SI_INTV. A first secondary virtual device may perform a first secondary network context task and a second secondary virtual device may perform a second secondary network context task, such that the first and second secondary network context tasks are performed within the SI_INTV. Further, the method may involve selecting from secondary network context tasks associated with a first secondary virtual device and a second secondary virtual device based, at least in part, on a comparison of the SI_INTV to thresholds related to channel switching latencies. The selection may also be based, at least in part, on a hardware state of the first transceiver. Still further, a first secondary virtual device may perform a first secondary network context task during the SI_INTV, an additional SI_INTV associated with the first secondary network context task may be identified and a second secondary virtual device may perform a second secondary network context task during the additional SI_INTV.

In one embodiment, the method may also involve restoring the state of the primary network context using the primary virtual device after performing the secondary network context task.

In another embodiment, the single physical device may have a second transceiver implementing an additional primary virtual device and at least one additional secondary virtual device, each additional primary virtual device and at least one secondary virtual device configured to operate in an independent network context, such that the method also involves determining an opportunity instant based, at least in part, on operation of the additional primary virtual device, suspending activity of the additional primary virtual device in an additional primary network context locally and transparently to a remote end of the additional primary network context, storing a state of the additional primary network context, and performing an additional secondary network context task with an additional secondary virtual device.

In yet another embodiment, the method may involve determining a SI_INTV associated with the opportunity instant having a duration determined based, at least in part, on a time required to switch channels and processing delays.

BRIEF DESCRIPTION OF THE DRAWINGS

Further features and advantages will become apparent from the following and more particular description of the embodiments, as illustrated in the accompanying drawings, and in which like referenced characters generally refer to the same parts or elements throughout the views, and in which.

DETAILED DESCRIPTION

Figure 1:
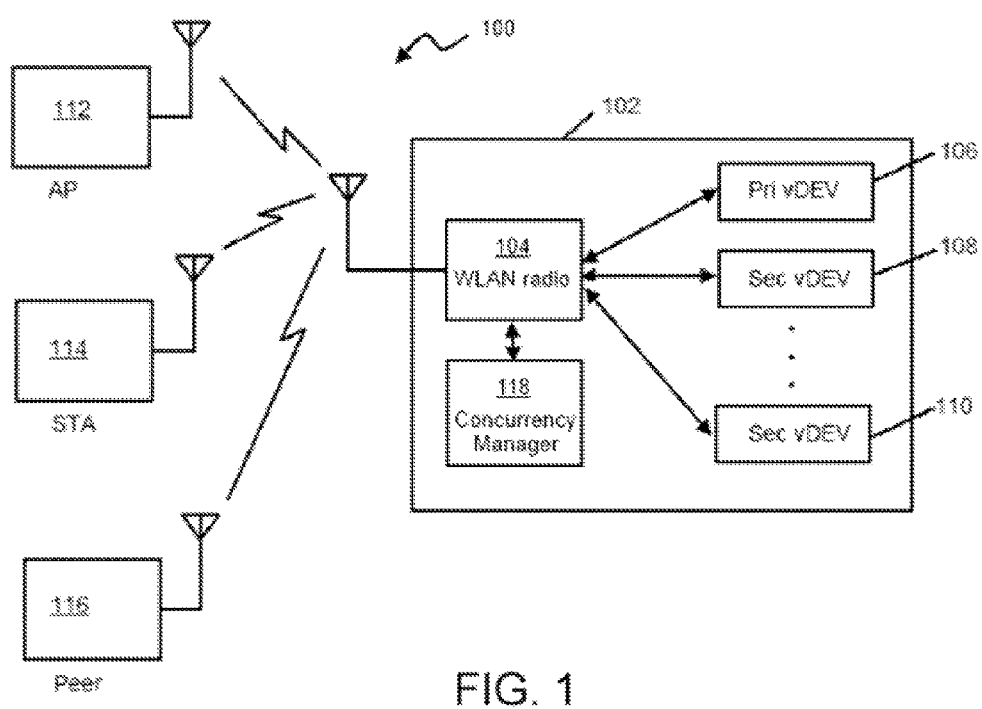
FIG. 1 schematically depicts a multimode device participating in multiple network contexts, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, examples of suitable materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments and is not intended to represent the only embodiments. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

The terms second level and first level, high and low, and 1 and 0, as used in the following description may be used to describe various logic states as known in the art. Particular voltage values of the second and first levels are defined arbitrarily with regard to individual circuits. Furthermore, the voltage values of the second and first levels may be defined differently for individual signals such as a clock and a digital data signal. Although specific circuitry has been set forth, it will be appreciated by those skilled in the art that not all of the disclosed circuitry is required to practice the inventive subject matter. Moreover, certain well known circuits have not been described, to maintain focus on the inventive subject matter.

Similarly, although the description refers to logical "0" and logical "1" or low and high in certain locations, one skilled in the art appreciates that the logical values can be switched, with the remainder of the circuit adjusted accordingly, without affecting operation of the present disclosure.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive subject matter. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the disclosure in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus or user agent. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to a base station. A base station may be utilized for communicating with one or more wireless nodes and may be termed also be called and exhibit functionality associated with an access point, node, Node B, evolved NodeB (eNB) or other suitable network entity. A base station communicates over the air-interface with wireless terminals. The communication may take place through one or more sectors. The base station may act as a router between the wireless terminal and the rest of the access network, which may include an Internet Protocol (IP) network, by converting received air-interface frames to IP packets. The base station may also coordinate management of attributes for the air interface, and may also be the gateway between a wired network and the wireless network.

Further, embodiments are discussed in specific reference to wireless networks, an in particular to WLANs conforming to IEEE 802.11 protocols. However, the concepts may also involve other forms of wireless communication, including BLUETOOTH® (Bluetooth), wireless fidelity (WiFi™), Wibree™, ultra wideband (UWB), Long Term Evolution (LTE), Enhanced Data for GSM Evolution (EDGE), Evolution Data Optimized (EVDO), General Packet Transceiver Service (GPRS) networks and others.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Various aspects of this disclosure concern maintaining operational functionality under a given network context. As one of skill in the art will recognize, operational functionality may include at least the exchange of a minimum amount of information for operation within a given network. When functioning as a station, a device may have few or no management requirements and essentially may only respond to beacon frames as appropriate and upload or download any data desired to be transferred. However, maintaining operational functionality may also require performing other tasks. For example, a device functioning in access point mode such as software enabled access point (soft-AP) may be required to satisfy significantly greater demands with regard to the transmittal and reception of management information as well as operating as the conduit for all information destined to or originating from any stations it is serving. As another example, a device in an ad hoc network may take on certain tasks, such as scanning adjacent channels for traffic or making channel assessments. The specific characteristics of the tasks necessary for maintaining operational functionality may be determined based, at least in part, on the type of network role and the amount and quality of information expected to be transferred.

As will be described in detail below, this disclosure is directed to systems and methods for enhancing the concurrency of a wireless device operating in multiple network contexts through the use of more flexible and more frequent opportunity instants that may exist within the normal exchange of information by a device having a single physical transceiver in a first network context. Each network context may be viewed as involving a virtual device implemented by a single physical device. In other words, the physical device may maintain a plurality of dedicated virtual devices, each corresponding to an independent network context. Generally, aspects of this disclosure will be described with respect to a first network context which may correspond to a primary virtual device and one or more secondary network contexts, each employing a corresponding second virtual device in the physical device.

As shown in FIG. 1, an exemplary communication system 100 having multiple network contexts is shown, and may include multimode device 102 having a single physical transceiver (or WLAN radio) 104. In this embodiment, transceiver 104 is configured for operation under one or more 802.11 protocols. Primary virtual device (Pri vDEV) 106 may use transceiver 104 to exchange information and maintain a communications link with one or more other network nodes in a primary network context. Similarly secondary virtual devices (Sec vDEV) 108 and 110 also may use transceiver 104 to maintain links in other, secondary network contexts. In the descriptions of this embodiment that follow, primary virtual device 106 has been authenticated and is associated with access point (AP) 112 in an infrastructure network context. Any suitable number of additional secondary virtual devices may be employed, from one to a plurality, each capable of operating in an independent network context. For example, secondary virtual device 108 may function as an access point, such as a software enabled access point (soft-AP), for station (STA) 114 and secondary virtual device 110 may have a direct peer-to-peer connection with peer 116 in an ad hoc network context.

In accordance with aspects of this disclosure, multimode device 102 may include concurrency manager 118 configured to identify opportunity instants with regard to operation in a network, such as with regard to the connection between primary virtual device 106 and access point 112. For each opportunity instant, concurrency manager 118 may determine a Silence Interval (SI_INTV) corresponding to the length of time that activity of primary virtual device 106 is not needed to maintain the communications link or otherwise participate in the network. Upon identification of a suitable opportunity instant and SI_INTV, concurrency manager 118 may grant secondary virtual device 108 or 110 access to transceiver 104, allowing communication with station 114 or peer 116, respectively, when the SI_INTV is of sufficient length to complete the designated task. As a practical matter, each virtual device operates on a different channel and may operate on a different band. A certain amount of time is required to switch channels and/or bands on transceiver 104 and this should be accounted for when determining whether the SI_INTV is of sufficient duration to perform the task involving the secondary virtual device. In some embodiments, the channel switching overhead is less than approximately 100 µs for intra-band switching and is less than approximately 120 µs for inter-band switching.

As discussed above, the techniques of this disclosure provide performance optimization by identifying of periods of time when operation is not required in a first network context to perform a task in a second network context during those periods. Rather than attempting to enter abbreviated power save modes, "nap modes," during periods of inactivity, multimode device 102 services secondary network contexts tasks to improve performance in those network contexts. In turn, these strategies provide an efficient use of the channels and the MAC and PHY layers. Further, despite forgoing the relatively short and abbreviated power save periods, the enhanced concurrency provided by this disclosure allows a more rapid completion of pending operations across all network contexts. As a consequence, more rapid completion of pending network tasks may allow multimode device 102 to enter a low power "sleep mode" state more quickly to conserver power.

In comparison, conventional "nap mode" implementation may requires more control and sophistication in the device, at a digital and analog level, and may only be offered as an optional mode in many implementations. Further, "nap modes" may not represent the lowest power states of the system. Additionally, most 802.11x devices, such as multi-mode device 102, by virtue of carrier sense access rules, may stay fully awake and continue to perform Clear Channel Assessment (CCA) during the time the access point 112 is servicing other devices in the infrastructure network. In such a deployment mode, the availability of periods of time during which a "nap mode" may be entered may be relatively scarce.

As will be described below, identification of suitable opportunity instants may depend upon the nature and characteristics of the communications link between primary virtual device 106 and access point 112. In one embodiment, an opportunity instant may be identified with regard to a frame being received by primary virtual device 106. Generally, each frame has a header that is processed at the physical (PHY) layer and a header that is processed at the media access control (MAC) layer. Depending upon the communications protocol being employed, different types of information may be present in the headers or preambles of a frame being delivered. Thus, concurrency manager 118 may identify opportunity instants based, at least in part, on operations occurring either at the PHY layer or at the MAC layer.

PHY Header

In one embodiment, information from the header of a very high throughput (VHT) frame may be filtered at the PHY layer to determine an opportunity instant. Primary virtual device 106 may be in reception mode and be awaiting frames sent from access point 112. As primary virtual device 106 receives a frame from access point 112, the PHY layer may parse the header to determine the partial Association Identifier (pAID) or the Group Identifier (GID), depending upon the operational mode of the virtual device. If the pAID or GID indicates that the frame being received is not intended for primary virtual device 106, an opportunity instant may be identified.

Figure 2:
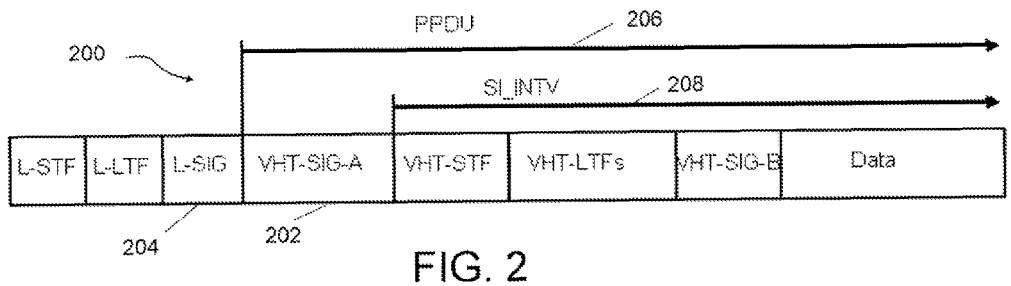
FIG. 2 schematically depicts the use pAID matching in the PHY header to identify an opportunity instant, according to one embodiment.

As shown in FIG. 2, primary virtual device 106 operating in single user (SU) VHT mode engaged in active reception may receive a VHT frame 200 having the depicted structure. The PHY layer may make a determination that the pAID obtained from the VHT signal A field (VHT-SIG-A) 202 does not match primary virtual device 106. Accordingly, there may be no benefit associated with continuing to receive VHT frame 200 and the pAID mismatch may be indentified as an opportunity instant. The remaining duration of VHT frame 200 following the legacy signal length field (L-SIG) 204 corresponds to the duration of the physical layer convergence procedure protocol data unit (PPDU) 206. By subtracting the duration of VHT-SIG-A 202, a duration for SI_INTV 208 may be defined.

Figure 3:
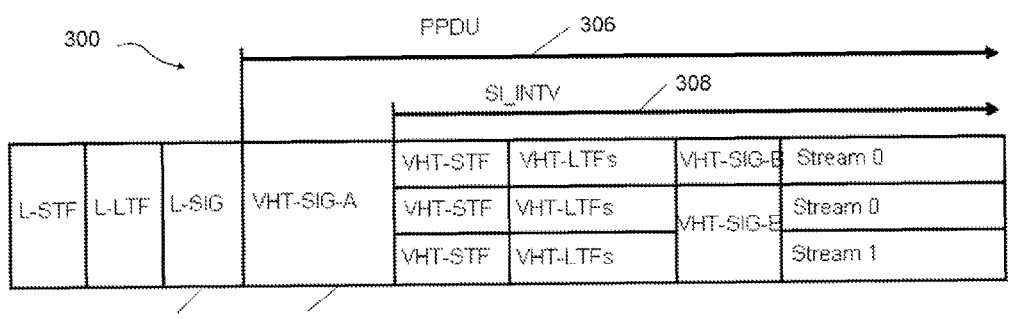
FIG. 3 schematically depicts a use of GID matching in the PHY header to identify an opportunity instant, according to one embodiment.

As shown in FIG. 3, primary virtual device 106 operating in multi user (MU) VHT mode engaged in active reception may receive a VHT frame 300 having the depicted structure. The PHY layer may make a determination that primary virtual device 106 is not a member of the group from the GID in VHT-SIG-A 302 and lack of membership may be identified as an opportunity instant. Similar to the embodiment above, L-SIG 304 defines PPDU 306 duration and SI_INTV 308 may be obtained by subtracting the duration of VHT-SIG-A 302.

In another embodiment, an error occurring at the PHY layer may be identified as an opportunity instant. When processing the PHY header, a number of errors are possible, including a failure of the cyclic redundancy check (CRC) of the L-SIG or VHT-SIG-A fields, non-convergence of the automatic gain control (AGC) and non-settling of the automatic frequency control (AFC). As will be appreciated, many other PHY errors are possible and may be used as desired to identify an opportunity instant. An error at the PHY level results in deferral of the channel access, up to the extended interframe space (EIFS). In one aspect, the SI_INTV may be determined to correspond to the channel deferral interval. Alternatively, repeated PHY errors may be converted into a SI_INTV that corresponds to a sum of the associated EIFSs and a power management trigger.

MAC Header

Figure 4:
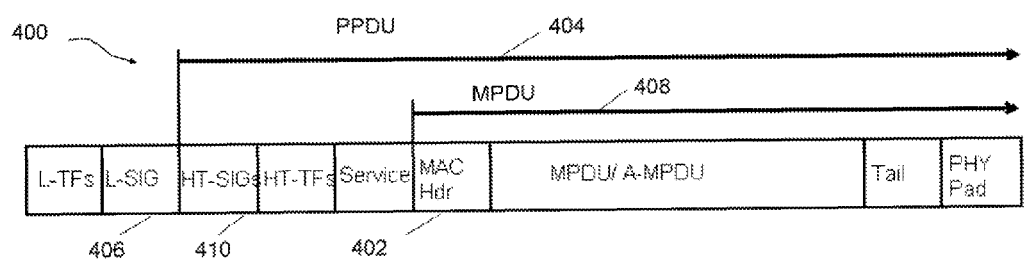
FIG. 4 schematically depicts a use of RA matching in the MAC header to identify an opportunity instant, according to one embodiment.

Other 802.11 protocols may not provide for filtering frames at the PHY header level. However, filtering at the MAC level may be used to identify opportunity instants. The SI_INTV may correspond to remaining frame length as determined from the MAC receiver address (RA) field. For example, as shown in FIG. 4, primary virtual device 106 may receive a legacy frame or a high throughput (HT) frame, such as an 802.11n frame 400. Processing the header at the MAC layer allows determination of the RA from MAC header (MAC Hdr) 402. If the RA does not match primary virtual device 106, an opportunity instant may be identified. The PPDU 404 duration may be obtained from L-SIG 406 and the MAC protocol data unit (MPDU) 408 duration may be obtained from high throughput signal field (HT-SIG) 410. In one aspect, the SI_INTV may be set to correspond to the network allocation vector (NAV) duration as obtained from MAC header 402, which specifies the amount of time granted by the carrier access mechanism for delivery of frame 400. Thus, when the processing of the MAC header determines that primary virtual device 106 is not the intended recipient of the packet, the remaining duration of the frame may be identified as an opportunity instant with the corresponding SI_INTV.

In one embodiment, the NAV field may be verified as a wrong value which can result in losing targeted frames from access point 112 or missing channel access opportunities. The conventional method for validating correct reception of a frame includes performing the frame check sequence (FCS) function at the end of the frame, which would preclude identifying an opportunity instant prior to that time. As such, it would be desirable to verify information including the RA and NAV values prior to receiving the FCS. Techniques for assessing the validity without waiting until the FCS check are disclosed in co-pending, commonly-owned U.S. Provisional Patent Application Ser. No. 61/595,562, filed Feb. 6, 2012, and U.S. patent application Ser. No. 13/620,284, filed Sep. 14, 2012, both of which are incorporated by reference in their entirety. For example, the quality of the channel may be assessed at a period of time corresponding to a given location within a frame, allowing determination of a validity window. Information within the validity window may be verified on the basis of the channel quality assessment. The channel quality assessment may be based, at least in part, on a channel quality metric such as Signal-to-Noise Ratio (SNR), Signal Interference Plus Noise Ratio (SINR), Received Signal Strength Indicator (RSSI) or confidence metrics from the Viterbi decoder output. Additional identifiers of channel quality metric may also include the Receiver Error Vector Magnitude (Rx-EVM), derived from the difference between the ideal and observed constellation points, after symbol demodulation. In one embodiment, the channel quality assessment may include confirming the SNR metric exceeds a suitable threshold, such as approximately 2 dB, above the minimum SNR needed for the Modulation/Coding Set (MCS) at which data is being received. Further examples include monitoring the Viterbi confidence metrics over a traceback length and verifying the received bits if the confidence level is higher than a minimum threshold.

Figure 5:
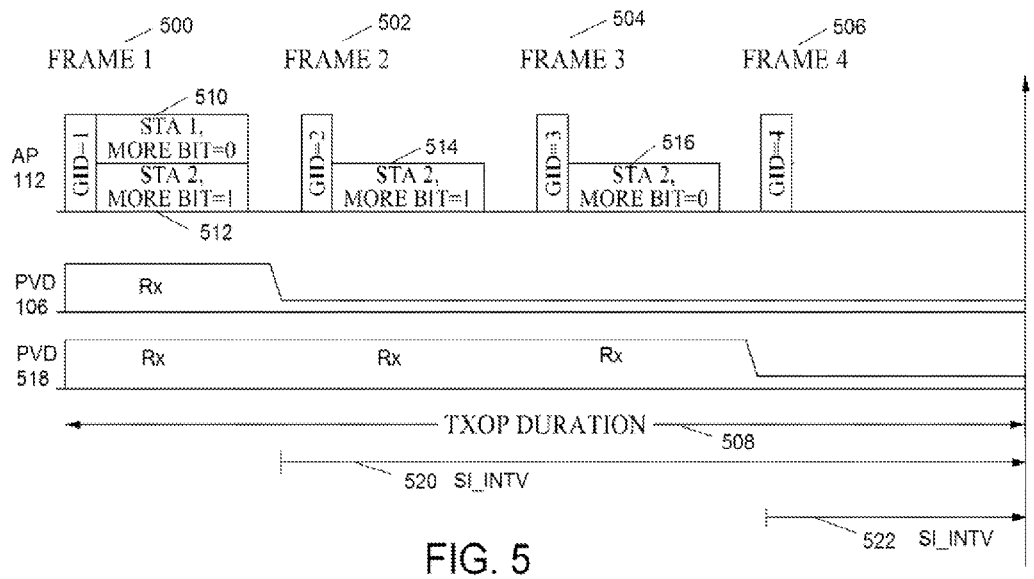
FIG. 5 schematically depicts a use of a TxOP in a multi-user MIMO downlink mode to identify an opportunity instant, according to one embodiment.

In other embodiments, primary virtual device (PVD) 106 operating in a downlink, multi user multiple input multiple output (MIMO) mode may employ a transmission opportunity (TxOP) power save function, triggering a doze state. Correspondingly, this may be identified as an opportunity instant, while the duration of the doze state may be determined to be the SI_INTV. As shown in FIG. 5, access point 112 transmits a series of frames Frame 1 500, Frame 2 502, Frame 3 504 and Frame 4 506 within a defined transmission opportunity (TxOP) Duration 508. In this simplified example, each frame contains a GID and may further include one or more data fields 510, 512, 514 and 516 designated for primary virtual device 106 or another primary virtual device (PVD) 518. A More Data bit in each data field indicates whether additional data is to be delivered in succeeding frames. As shown, upon receipt of Frame 1 500, data field 510 designated for primary virtual device 106 has the More Data bit unset (More Bit=0). Since no more data is designated for primary virtual device 106, concurrency manager 118 may identify an opportunity instant for primary virtual device 106 at this point and SI_INTV 520 may be defined by the remainder of TxOP Duration 508. On the other hand, primary virtual device 518 receives Frame 1 500, Frame 2 502 and Frame 3 504 having data fields 512, 514 and 516, respectively, as shown. Data fields 512 and 514 have the More Data bit set (More Bit=1), so primary virtual device 518 remains in active reception mode. Upon receipt of Frame 3 504, data field 516 has the More Data bit unset, so primary virtual device 518 may identify an opportunity instant and determine SI_INTV 522 having a duration corresponding to the remaining portion of TxOP Duration 508.

In another embodiment, 802.11 protocols may support provisions for enhancing quality of service (QoS) such as the use of frame exchange sequences (FES). Rather than requiring each communication between the access point and the station to go through a channel contention process under a conventional carrier access mechanism, groups of frames may be assigned to a single TxOP. An FES function may be implemented by using the network allocation vector (NAV) to reserve the channel for the length of the TxOP duration. By determining that primary virtual device 106 is not the recipient of the frames, an opportunity instant may be identified and the SI_INTV defined as the NAV duration. In one aspect, multimode device 102 processes the entire first frame through the FCS, updating the NAV and assigning the duration to the SI_INTV once when the frame is validated. Alternatively, the channel quality metric assessment techniques described above may be used to make a validity determination of the RA and the NAV, prior to receiving the FCS.

Yet other opportunity instants may be identified from information contained within the MAC header. Various communications may be received by multimode device 102 which indicates that the transmitting node intends to suspend communication for a period of time. These periods and the associated durations may be used to identify opportunity instants and related SI_INTV. For example, in a WiFi Direct network context, peer 116 operating as a group owner (P2P GO) may send a notice of absence (NOA) information element (IE) in the MAC header. Upon processing this frame, an opportunity instant may be indentified and the duration of the absence may be assigned to the SI_INTV. In another example, access point 112 may transmit a frame with a quiet information element (QIE) in the MAC header to inform multimode device 102 of an unscheduled period of inactivity. Likewise, an opportunity instant may be indentified by processing this frame and the duration of the absence may be assigned to the SI_INTV.

Other Sources of Information

Figure 6:
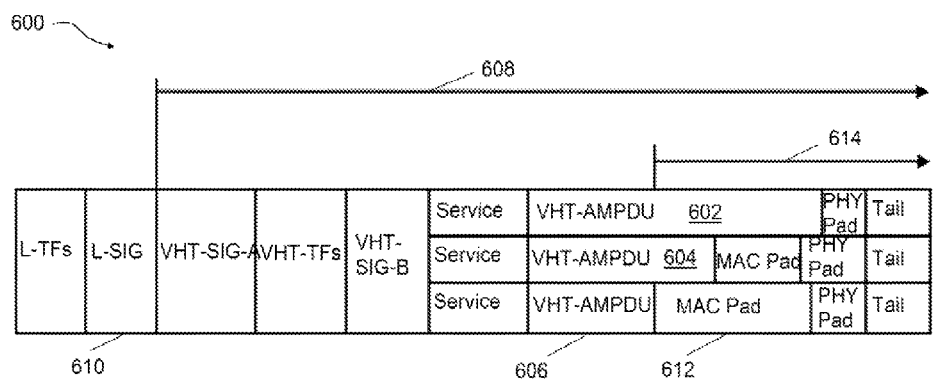
FIG. 6 schematically depicts a use of an EOF delimiter in a MAC data unit to identify an opportunity instant, according to one embodiment.

In addition to filtering the PHY and MAC headers of received frames, concurrency manager 118 may identify one or more opportunity instants from information obtained from other sources. In one embodiment, a multi user frame may include aggregated data fields for delivery to different nodes. If not all data fields are intended for each node, the resulting aggregate MPDUs (AMPDUs) may differ in length. If the AMPDU for a designated receiving node does not fill the frame, a MAC pad formed from a repeating sequence with an end of frame (EOF) padding delimiter may be concatenated to the AMPDU to fill the remaining portion of the frame. Accordingly, an opportunity instant may be identified when MAC processing reaches an EOF delimiter. FIG. 6 depicts VHT frame 600 having AMPDUs 602, 604 and 606, with AMPDU 606 addressed for primary virtual device 106. PPDU 608 duration may be determined from L-SIG 610. As primary virtual device 106 processes the frame, it may receive the data contained in AMPDU 606. When the MAC detects the beginning of MAC pad 612, it may identify an opportunity instant and set SI_INTV 614 to have a duration corresponding to the remaining duration of frame 600 as determined from PPDU 608 duration.

Another example of the identification of opportunity instants relates to embodiments in which multimode device 102 has an additional wireless communication system, such as Bluetooth or LTE. Concurrency manager 118 may obtain information from the coexistence mechanisms that coordinate operation of the transceiver 104 and the additional wireless communication systems to identify an opportunity instant. For example, scheduled Bluetooth communication windows under a synchronous connection-oriented (SCO) link are provided to ensure a desired level of throughput for the Bluetooth link. Periods scheduled for Bluetooth transmission using an automatic frequency hopping technique may be identified as opportunity instants that may be used to perform a secondary network context task on a different 2.4 GHz channel or on the 5 GHz band. As will be appreciated, this implementation may require that multimode device 102 features separate transceivers for the WLAN and Bluetooth systems. Similarly, a suitable LTE coexistence trigger may be used to identify opportunity instants for performing a secondary network context task on a different, sufficiently isolated 2.4 GHz channel or on the 5 GHz band.

Another aspect of the enhanced concurrency techniques of this disclosure may be implemented by extending the use of the channel quality metric assessments described above. The quality assessment may indicate, during reception of a frame, that the channel has degraded to the point that it is unlikely the frame will be properly received. Once this assessment has been made, reception of the frame may be terminated immediately and an opportunity instant may thereby be identified for the remainder of the frame, contingent on successful decoding of the NAV interval from the initial frame header. The SI_INTV may be determined as corresponding to the remaining duration of the frame.

The opportunity instants identified by the enhanced concurrency techniques of this disclosure may be distinguished from the use of a listen interval as an opportunity instant. A listen interval is a fixed period of time, the parameters of which are established by an access point that may be triggered by a station sending a message that it is entering a low power mode. As a result, employing an opportunity instant based, at least in part, on a listen interval requires a modification in the behavior of other nodes in the network context. Specifically, the access point may start buffering frames for the station and may not conduct otherwise regularly scheduled information exchanges. Typically, a listen interval opportunity instant must be created by sending an explicit power management message. In contrast, the identification of an enhanced concurrency opportunity instant as provided by this disclosure does not require a behavior modification in other network nodes or an explicit signaling exchange with those nodes. Rather, an existing period of time that may be used as an opportunity instant may be identified using information obtained from the operation of multimode device 102, such as from the MAC or PHY headers of frames being received and happens transparently to the other network nodes, such as access point 112.

As will be appreciated, the techniques of this disclosure represent the potential for determining opportunity instants in which secondary network context tasks may be performed. For example, in the VHT embodiments, a VHT frame may be approximately 5 ms, representing an opportunity instant having a significant duration for performing tasks with regard to the secondary network contexts. In one embodiment, any secondary network context tasks, to the extent a secondary network context task may be subdivided into discrete operations, such task-slices, may be time constrained to the SI_INTV.

One process for maintaining such time constraint is to estimate the time required to perform the secondary network context task as including two times the channel switching time and accounting for any processing times associated with the MAC layer and transceiver baseband. If the time estimate is less than the SI_INTV, multimode device 102 may undertake the channel switch to service the secondary network context. Also, the time estimate may account for any delays associated with the channel access mechanism, such as the enhanced distributed channel access (EDCA) and the point coordination function (PCF) of the 802.11 protocols. In certain embodiments, multimode device 102 may immediately start transmitting on the switched channel as part of a new network context, without performing a backoff procedure dictated by EDCA rules. However, it should be recognized that such a configuration may not be compliant with current IEEE 802.11x specifications. As desired, multimode device 102 may also be configured to terminate a secondary network task regardless of the SI_INTV if necessary, by sending an appropriate power save message in the secondary network context, switching channels and returning to the primary network context.

In further embodiments of this disclosure, adaptive techniques may be employed to control the utilization of any identified opportunity instants. For example, thresholds may be used to trigger the servicing of a task for a secondary network context once an opportunity instant is identified. A first threshold may be established based, at least in part, on the minimum time necessary to perform an intra-band channel switch and perform the secondary network context task such that if the SI_INTV is less than this threshold, multimode device 102 may maintain access of primary virtual device 106 to transceiver 104. In this situation, primary virtual device 106 may enter a power save mode to conserve power when there is insufficient time to service the secondary network context task. A second threshold may be established based, at least in part, on the time required to perform an inter-band switch, such that if the SI_INTV is between the first and second thresholds, a secondary network context task involving an intra-band switch may be performed. Correspondingly, if the SI_INTV exceeds the second threshold, a secondary network context task involving an inter-band switch may be performed.

Other aspects of the disclosure are directed to optimizing use of the entire SI_INTV. In a first embodiment, if time remains in the SI_INTV after servicing one secondary network context task, multimode device 102 may be configured to return transceiver 104 to primary virtual device 106 to continue with conventional operation, including engaging in the abbreviated power save mode or performing clear channel assessments, or otherwise operating as dictated by the primary network context. In additional embodiments, multiple secondary network context tasks may be performed as allowed by the duration of the SI_INTV. One mechanism that may be used to implement this feature is to identify an opportunity instant with respect to operation in the secondary network context, while maintaining the SI_INTV associated with the opportunity instant identified with respect to operation in the primary network context. Thus, concurrency manager 118 of multimode device 102 may identify an opportunity instant with respect to operation of primary virtual device 106, if the SI_INTV is sufficient, secondary virtual device 108 may be given access to transceiver 104 to perform a secondary network context task. The operation of secondary virtual device 108 may be monitored to indentify an additional opportunity instant. If one is identified, and if the time remaining in the SI_INTV is sufficient, secondary virtual device 110 may be granted access to transceiver 104 to perform a secondary network context task. The SI_INTV period may be consumed by performing as many secondary network context tasks as possible until the time remaining is below the first threshold. At this point, primary virtual device 106 may regain access to transceiver 104 and operate as indicated by the primary network context, as described above. The depth of nesting may be either pre-configured to a maximum number or determined at run-time depending on availability of time-instants within the main SI_INTV, identified from the primary network context. Further, selection between secondary network context tasks may be made based, at least in part, on factors affecting SI_INTV, such as processing delays or channel/band switches that may be required to perform a given task. As such, concurrency manager 118 may select a secondary network context task based, at least in part, on a hardware state of transceiver 104, such as the current band of operation.

Although the above techniques have been described primarily in relation to a multimode device having single physical transceiver implementing multiple virtual devices that operate in multiple network contexts, one of skill in the art will recognize that these concepts may be extended to devices having multiple physical transceivers, such that each transceiver may implement multiple virtual devices. An example of such a device with multiple, independent, wireless transceivers is a Dual Band Dual Concurrent (DBDC) access point having one transceiver for the 2.4 GHz band and another transceiver for the 5 GHz band. By identifying opportunity instants during the operation of each transceiver in its respective primary network context in its respective band (2.4 GHz or 5 Ghz), secondary network context tasks may be performed to improve the overall efficiency of the device in transparent manner to the nodes of the other network contexts in the same band. As will be appreciated, the embodiments of this disclosure when applied to a DBDC receiver may improve the overall performance because inter-band channel switching may not be necessary and all multiplexing can be performed within the respective band, thereby increasing the SI_INVT associated with the opportunity instant.

In a first aspect, each transceiver of a device having multiple physical transceivers may be configured similarly to multimode device 102 as described above. Generally, each transceiver then corresponds to a physical device implementing a primary virtual device and one or more secondary virtual devices. Operation of each transceiver in its primary network context may be analyzed to determine opportunity instants using any of the identification methods previously discussed. Upon identification of an opportunity instant and a determination of a corresponding SI_INTV, each transceiver may switch channels to perform a secondary network context task.

Additional implementations of these techniques in a device having multiple transceivers may include embodiments in which a multimode device may use two (or more) transceiver chains simultaneously in a MIMO mode or may use each chain independently. Accordingly, one chain may be used to perform any suitable network context task while the other chain may be used for an independent task. For example, the other chain may search for beacons, operate in a network sleep mode, operate in a MIMO-PS mode, grant access to the other chain to a separate wireless communication system such as Bluetooth (e.g., in conjunction with a coexistence strategy), or the like. The chains may operate independently during any situation in which simultaneous operation of the two chains is not required. Upon completion of the other network context tasks, both chains may be used to operate in two spatial stream mode as desired.

Figure 7:
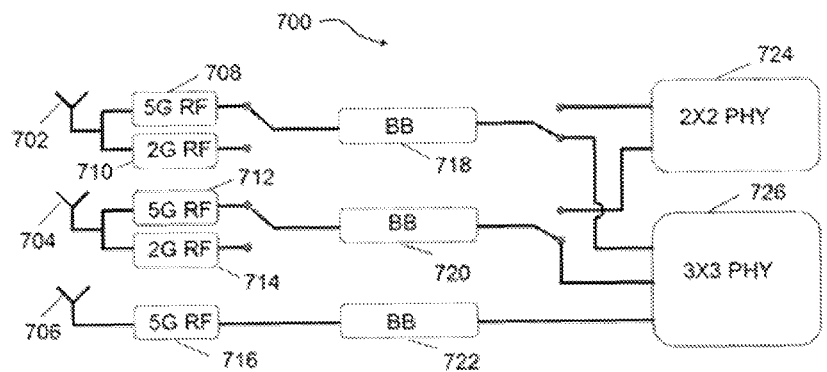
FIG. 7 schematically depicts a 3×3 DBDC receiver architecture suitable for use in an embodiment.

One example of a DBDC embodiment is shown in FIG. 7, which depicts 3×3 DBDC 700 having three antennas 702, 704 and 706. Antenna 702 has a 5 GHz radio frequency module (5G RF) 708 and a 2.4 GHz radio frequency module (2G RF) 710. Similarly, antenna 704 also has dual modules, 5G RF 712 and 2G RF 714. As shown, antenna 706 provides transmission only on the 5 GHz band, using 5G RF 716. Baseband modules (BB) 718, 720 and 722 are coupled to antennas 702, 704 and 706, respectively. BB 718 may be switched between 5G RF 708 and 2G RF 710 and BB 720 may be switched between 5G RF 712 and 2G RF 714 for both the 5 GHz band and the 2.4 GHz band. In turn, BBs 718 and 720 may be independently switched between 2×2 PHY 724 and 3×3 PHY 726. BB 722 is coupled to 3×3 PHY 726. PHY 724 and 726 may be configured to operate under any suitable protocol, such as PHY 724 being configured for 802.11n protocol and PHY 726 being configured for 802.11ac protocol. BBs 718, 720 and 722 may be configured to operate at any suitable bandwidth as desired for operation under the various options, including 10, 20, 40, 80 and 82.5 MHz.

This embodiment enables a number of modes of operation, including full 3×3 at 160 MHz in the 5 GHz band, 2×2 at 160 MHz in the 5 GHz band and 1×1 at 40 MHz in the 2.4 GHz band, and 1×1 at 160 MHz in the 5 GHz band and 2×2 at 40 MHz in the 2.4 GHz band. In one aspect, BB 718 may be switched to 2G RF 710 and BB 720 may be switched to 5G RF 712, allowing antennas 704 and 706 and the respective basebands, BB 720 and 722 to operate in 2×2 mode in the 5 GHz band while antenna 702 and BB 718 operates in 1×1 mode in the 2.4 GHz band. Thus, with respect to the 2×2 5 GHz mode, one chain may independently be used to search for beacons in a network sleep mode, operate in a MIMO-PS mode or grant access to another system such as Bluetooth, as described above. DBDC 700 may also return to full 3×3 mode as desired, such as by sending a power management message via antenna 702 and then switching BB 718 to 5G RF 708. These concepts may also be applied if portions of the radio frequency hardware are shared by other communication systems, such as LTE. For example, BBs 718 and 720 may be switched to 2G RFs 710 and 714, respectively, to allow 2×2 LTE operation while BB 722 provides 1×1 WLAN operation.

As one of skill in the art will appreciate, the above techniques regarding the identification of opportunity instants and the assignment of related SI_INTV to the virtual devices of multimode device 102 may be implemented using any suitable combination of software and hardware implementations. In one embodiment, concurrency manager 118 may be configured to implement enhanced channel concurrency through appropriate software instructions in the host controller. As described above, information from the MAC and PHY of transceiver 104 may be obtained with regard to opportunity instants and their corresponding SI_INTV. The host may then schedule periods within each SI_INTV to the respective secondary virtual devices using any suitable scheduling algorithm, such as round robin (RR) or first come, first served (FCFS). Although relatively flexible and easy to implement, software based scheduling may require an increased time overhead due to the need to involve the software and MAC and PHY layers, as well as the channel switching overhead, to perform a task in a secondary network context. In view of the delays imparted by software, it may be desirable to use software implemented enhanced concurrency with relatively longer opportunity instants, such as those determined by MAC filtering of the RA, TxOP FES intervals, maximal length VHT packets, LTE or Bluetooth coexistence routines and the like.

In another embodiment, concurrency manager 118 may be implemented using any desired combination of firmware or hardware, such as at the MAC layer of transceiver 104, and may be configured to perform aspects of the enhanced channel concurrency operation. By employing a dedicated hardware controller in the MAC to identify the opportunity instant and SI_INTV, to switch channels and to schedule and execute the secondary network context tasks, computing demands on the host may be reduced and delays associated with involving the host software may be avoided. As will be appreciated, any suitable combination of hardware and software techniques may be employed to implement these and related concurrency operations. In general, software techniques may provide more flexibility in configuring the operations while hardware techniques may provide enhanced performance.

Figure 8:
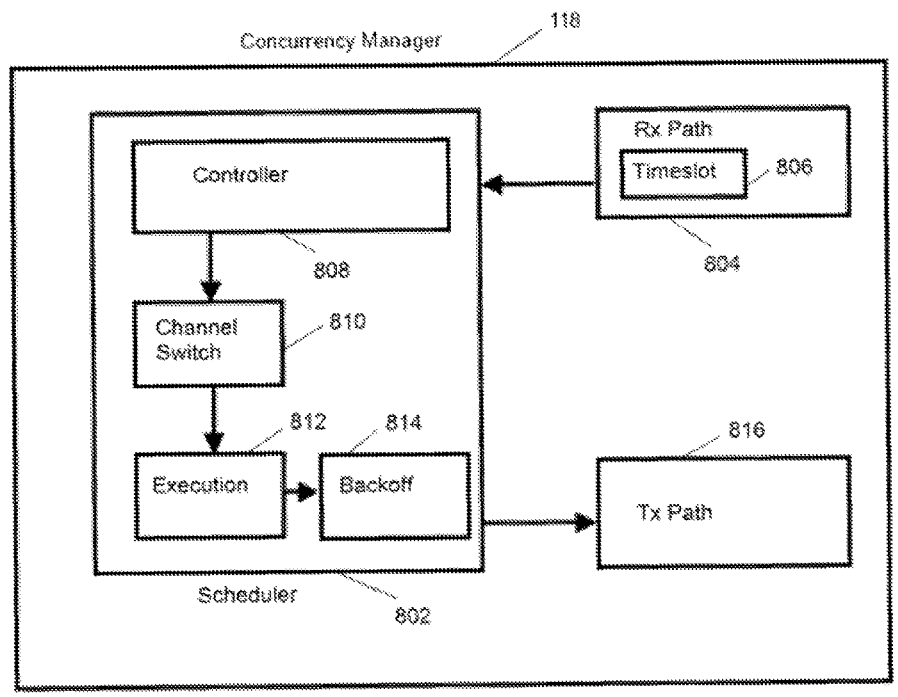
FIG. 8 schematically depicts functional blocks of the MAC layer of a multimode device, according to one embodiment.

One example of a primarily hardware oriented embodiment is depicted schematically in FIG. 8, and illustrates selected functional blocks of concurrency module 118 of a multimode device, suitable for practicing the techniques of this disclosure. As shown, concurrency manager 118 includes a scheduling module (Scheduler) 802 configured to maintain command queues of secondary network context tasks determined by requests from the respective virtual devices. In general, command requests may be issued by the virtual devices and include an identification of the channel involved, predicted duration, the type of operation and a buffer pointer or other record locator. Scheduling module 802 may perform a first order assignment of priority to queue the command requests based on the information in the command requests and any suitable scheduling algorithm, such as RR or FCFS. The receive (Rx) path 804 may include timeslot detector 806 configured to identify opportunity instants and determine the corresponding SI_INTV based, at least in part, on information determined from the MAC or PHY layers or other sources as described above. Controller module 808 may be configured to match command requests to the SI_INTV of the identified opportunity instants. Once a command request is identified that may be performed in the SI_INTV duration, including any hardware and software delays, channel switch module 810 changes the channel, and band if warranted, and the command request is sent to execution module 812 to be carried out. To conform with the channel access mechanisms of the associated network protocols, a dedicated backoff module 814 may participate in any contention process before sending the command request to transmit (Tx) path 816. Alternatively, it may be desirable to operate concurrency manager 118 in a mode that does not adhere to network protocols regarding channel access so that command requests may be delivered directly from execution module 812 to transmit path 816 without performing a backoff operation.

By employing the enhanced concurrency techniques of this disclosure, considerable performance improvements in a plurality of network contexts may be realized. For example, roaming and loss of link handling strategies may be improved by providing greater information about BSSs that are in range or come into range. Such additional information may now be obtained by providing the primary network context mode enough opportunity intervals to go off-channel into another network context and scan the background more frequently than it would have using conventional techniques. As such, multimode device 102 may maintain an active traffic mode with respect to primary virtual device 106 while still using opportunity instants to allow secondary virtual devices to perform channel scans. Accordingly, roaming performance under 802.11r protocols and in other voice and video applications may be improved. Likewise, recovery from a link loss may be facilitated by providing more complete and updated channel scans, particularly when a greater number of opportunity instants are available, such as with background or best effort traffic.

Performance in peer-to-peer network contexts may also be improved by allowing P2P discover and scan operations to occur, even when the primary virtual device is in an active traffic mode. Other types of peer-to-peer communication systems may also benefit from the enhanced concurrency. For example, some peer-to-peer connections may require one device to function as a master, with which incur additional management functions. In systems involving coordinated channel changes, the master device may need to perform channel scans in addition to participating in traffic exchange. By increasing the number of opportunity instants available, such channel scans may be performed more readily without substantially degrading performance in other areas while optimizing the channel change coordination.

In yet another example, a given network context may allow an access point to respond to a station-originated PS-POLL frame, immediately after the minimum period of time defined by 802.11 protocols, the short interframe space (SIFS). Response after the SIFS is known as SIFS-bursting and may represent a substantial decrease in latency between access point and a power-saving station coming out of power save mode. By using an opportunity instant to switch from a primary virtual device to a secondary virtual device, the SIFS-bursting mode may be triggered to facilitate retrieval of information from the access point. As an example, a multimode device according to the disclosure may be connected to two access points in two different network contexts. Upon identification of an opportunity instant in the first network context, the device may switch to the second network context, sending a PS-POLL to request transmission of buffered frames from the second access point. Given that this operation should be time constrained to the SI_INTV duration so that the device returns to the first network context transparently to the first access point, a faster response from the second access point to transmit the buffered data is advantageous for successful performance of this enhanced concurrency mode. By utilizing the opportunity instant to initiate a SIFS-bursting sequence, the desired faster response may be achieved.

Figure 9:
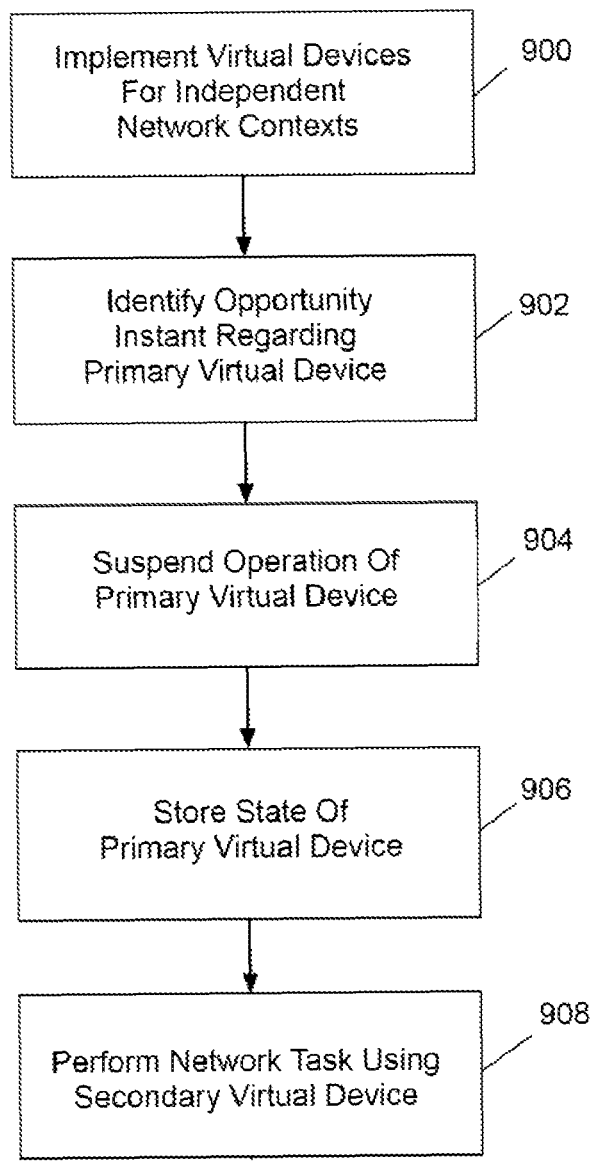
FIG. 9 is a flowchart showing an exemplary routine for coordinating operation of virtual devices using identified opportunity instants, according to one embodiment.

To help illustrate various embodiments, an exemplary routine for coordinating operation of virtual devices using identified opportunity instants is represented by the flowchart depicted in FIG. 9. As shown, the routine may begin at 900 upon the implementation of a plurality of virtual devices associated with transceiver 104 of multimode device 102. As described above, each virtual device may operate in an independent network context. With respect to operation of one virtual device, such as primary virtual device 106, in 902 concurrency manager 118 may identify an opportunity instant using any suitable technique, including those disclosed above. When the identified opportunity instant is associated with a sufficient duration, operation of primary virtual device 106 may be suspended in 904. Notably, a characteristic of an opportunity instants of this disclosure is that no participation of primary virtual device 106 may be expected with regard to its operation in its corresponding network context. Accordingly, primary virtual device 106 may suspend activity without transmitting coordinating information regarding the suspension of activity. In turn, the suspension of activity by primary virtual device 106 may have no effect on the operation of other nodes operating on the same network and therefore be transparent to a remote end of the primary network context. In 906, concurrency manager 118 may store a current state of the primary network context, which may represent information associated with the operation of primary virtual device 106 in the primary network context at the time activity was suspended. Concurrency manager 118 may then use transceiver 104 to perform a task for another virtual device, such as secondary virtual device 108 or 110, with regard to its network context as represented by 908.

Described herein are exemplary embodiments. However, one skilled in the art will understand that the principles of this disclosure can be extended easily with appropriate modifications to other applications.

What is claimed is:

1. A device for wireless communication comprising a single physical device having:
 a first transceiver;
 a primary virtual device;
 at least one secondary virtual device; and
 a first concurrency module, wherein the primary virtual device and at least one secondary virtual device are implemented by the first transceiver, wherein each of the primary virtual device and at least one secondary virtual device is configured to operate in an independent network context, wherein the first concurrency module is configured to:
 identify an opportunity instant based, at least in part, on operation of the primary virtual device during reception of an incoming frame;
 suspend activity of the primary virtual device in a primary network context locally and transparently to a remote end of the primary network context;
 store a state of the primary network context; and
 perform a secondary network context task using a secondary virtual device.

2. The device of claim 1, wherein the opportunity instant is identified based, at least in part, on information obtained from a physical layer header of a frame received by the primary virtual device.

3. The device of claim 2, wherein the opportunity instant is identified based, at least in part, on a partial association identifier obtained from the physical layer header.

4. The device of claim 2, wherein the opportunity instant is identified based, at least in part, on a group identifier obtained from the physical layer header.

5. The device of claim 2, wherein the opportunity instant is identified based, at least in part, on an end of frame (EOF) delimiter.

6. The device of claim 1, wherein the opportunity instant is identified based, at least in part, on information obtained from a media access control (MAC) layer header of a frame received by the primary virtual device.

7. The device of claim 6, wherein the opportunity instant is identified based, at least in part, on a notice of absence (NOA) information element (IE) of the frame.

8. The device of claim 6, wherein the opportunity instant is identified based, at least in part, on a quiet information element (QIE) of the frame.

9. The device of claim 6, wherein the opportunity instant is identified based, at least in part, on a receive address obtained from the MAC layer header.

10. The device of claim 9, wherein the opportunity instant has a duration based, at least in part, on a network allocation vector (NAV) of the frame.

11. The device of claim 1, wherein the opportunity instant is identified based, at least in part, on a doze state of the primary virtual device while operating in a downlink, multi user multiple input multiple output (MIMO) mode.

12. The device of claim 1, wherein the opportunity instant is identified based, at least in part, on when a channel quality metric assessment regarding the incoming frame falls below a threshold associated with successful reception.

13. The device of claim 1, wherein the device further comprises an additional transceiver for a separate wireless communication system and wherein the opportunity instant is identified based, at least in part, on coexistence information regarding a separate wireless communication system.

14. The device of claim 13, wherein the separate wireless communication system comprises a long term evolution (LTE) system.

15. The device of claim 13, wherein the separate wireless communication system comprises a Bluetooth system.

16. The device of claim 1, wherein the opportunity instant is identified during an active traffic mode of the primary virtual device.

17. The device of claim 1, wherein the first concurrency module is further configured to determine a SI_INTV associated with the opportunity instant, such that the secondary network context task may be performed within the SI_INTV.

18. The device of claim 17, further comprising a first secondary virtual device and a second secondary virtual device, wherein the first concurrency module is further configured to allow the first secondary virtual device to perform a first secondary network context task and to allow the second secondary virtual device to perform a second secondary network context task, such that the first and second secondary network context tasks may be performed within the SI_INTV.

19. The device of claim 17, further comprising a first secondary virtual device and a second secondary virtual device, wherein the first concurrency module is further configured to select from secondary network context tasks associated with the first secondary virtual device and the second secondary virtual device based, at least in part, on a comparison of the SI_INTV to thresholds related to channel switching latencies.

20. The device of claim 19, wherein the first concurrency module selects at least one secondary network context task based, at least in part, on a hardware state of the first transceiver.

21. The device of claim 17, further comprising a first secondary virtual device and a second secondary virtual device, wherein the first concurrency module is further configured to allow the first secondary virtual device to perform a first secondary network context task during the SI_INTV, to identify an additional SI_INTV associated with the first secondary network context task and to allow the second secondary virtual device to perform a second secondary network context task during the additional SI_INTV.

22. The device of claim 1, wherein the first concurrency module is further configured to restore the state of the primary network context using the primary virtual device after performing the secondary network context task.

23. The device of claim 1, wherein the single physical device further comprises a second transceiver.

24. The device of claim 23, wherein the single physical device further comprises a second concurrency module, wherein the second transceiver implements an additional primary virtual device and at least one additional secondary virtual device, each additional primary and at least one secondary virtual device configured to operate in an independent network context, wherein the second concurrency module is configured to determine an opportunity instant based, at least in part, on operation of the additional primary virtual device, to suspend activity of the additional primary virtual device in an additional primary network context locally and transparently to a remote end of the additional primary network context, to store a state of the additional primary network context and perform an additional secondary network context task using an additional secondary virtual device.

25. The device of claim 1, wherein the first concurrency module is further configured to determine a SI_INTV associated with the opportunity instant, wherein the SI_INTV has a duration that is determined based, at least in part, on a time required to switch channels and processing delays.

26. A method for wireless communication, comprising:
implementing a primary virtual device and at least one secondary virtual device operating in independent network contexts with a first transceiver of a single physical device;
identifying an opportunity instant based, at least in part, on operation of the primary virtual device;
suspending activity of the primary virtual device in a primary network context locally and transparently to a remote end of the primary network context;
storing a state of the primary network context; and
performing a secondary network context task using a secondary virtual device.

27. The method of claim 26, wherein identifying the opportunity instant is based, at least in part, on information obtained from a physical layer header of a frame received by the primary virtual device.

28. The method of claim 27, wherein identifying the opportunity instant is based, at least in part, on a partial association identifier obtained from the physical layer header.

29. The method of claim 27, wherein identifying the opportunity instant is based, at least in part, on a group identifier obtained from the physical layer header.

30. The method of claim 27, wherein identifying the opportunity instant is based, at least in part, on an end of frame (EOF) delimiter.

31. The method of claim 26, wherein identifying the opportunity instant is based, at least in part, on information obtained from a media access control (MAC) layer header of a frame received by the primary virtual device.

32. The method of claim 31, wherein identifying the opportunity instant is based, at least in part, on a notice of absence (NOA) information element (IE) of the frame.

33. The method of claim 31, wherein identifying the opportunity instant is based, at least in part, on a quiet information element (QIE) of the frame.

34. The method of claim 31, wherein identifying the opportunity instant is based, at least in part, on a receive address obtained from the MAC layer header.

35. The method of claim 34, wherein identifying the opportunity instant is based, at least in part, on a network allocation vector (NAV) of the frame.

36. The method of claim 26, wherein identifying the opportunity instant is based, at least in part, on a doze state of the primary virtual device while operating in a downlink, multi user multiple input multiple output (MIMO) mode.

37. The method of claim 26, wherein identifying the opportunity instant is based, at least in part, on when a channel quality metric assessment regarding the incoming frame falls below a threshold associated with successful reception.

38. The method of claim 26, wherein identifying the opportunity instant is based, at least in part, on coexistence information regarding a separate wireless communication system of the single physical device.

39. The method of claim 38, wherein the separate wireless communication system comprises a long term evolution (LTE) system.

40. The method of claim 38, wherein the separate wireless communication system comprises a Bluetooth system.

41. The method of claim 26, wherein identifying the opportunity instant occurs during an active traffic mode of the primary virtual device.

42. The method of claim 26, further comprising determining a SI_NTV associated with the opportunity instant, such that performing the secondary network context task occurs during the SI_INTV.

43. The method of claim 42, wherein performing the secondary network context task comprises performing a first secondary network context task with a first secondary virtual device, further comprising performing a second secondary network context task with a second secondary virtual device, such that the first and second secondary network context tasks are performed within the SI_INTV.

44. The method of claim 42, wherein performing the secondary network context task comprises selecting among secondary network context tasks associated with a first secondary virtual device and a second secondary virtual device based, at least in part, on a comparison of the SI_INTV to thresholds related to channel switching latencies.

45. The method of claim 44, further comprising performing at least one secondary network context task based, at least in part, on a hardware state of the first transceiver.

46. The method of claim 42, wherein performing the secondary network context task comprises performing a first secondary network context task with a first secondary virtual device, further comprising identifying an additional SI_INTV associated with the first secondary network context task and performing a second secondary network context task with a second secondary virtual device during the additional SI_INTV.

47. The method of claim 26, further comprising restoring the state of the primary network context using the primary virtual device after performing the secondary network context task.

48. The method of claim 26, wherein the single physical device further comprises a second transceiver implementing an additional primary virtual device and at least one additional secondary virtual device, each additional primary and at least one secondary virtual device configured to operate in an independent network context, further comprising:
   determining an opportunity instant based, at least in part, on operation of the additional primary virtual device;
   suspending activity of the additional primary virtual device in an additional primary network context locally and transparently to a remote end of the additional primary network context;
   storing a state of the additional primary network context; and
   performing an additional secondary network context task with an additional secondary virtual device.

49. The method of claim 26, further comprising determining a SI_INTV associated with the opportunity instant having a duration based, at least in part, on a time required to switch channels and processing delays.

* * * * *